United States Patent
Akers, Jr. et al.

(10) Patent No.: US 7,682,434 B2
(45) Date of Patent: Mar. 23, 2010

(54) WAX EMULSION FOR INKJET INK

(75) Inventors: Charles Edward Akers, Jr., Lexington, KY (US); Michael James Bensing, Lexington, KY (US); Rahel Bekru Bogale, Lexington, KY (US); Xiaorong Cai, Lexington, KY (US); Jun Li, Lexington, KY (US); Jing X. Sun, Lexington, KY (US); Qi Yin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 115 days.

(21) Appl. No.: 11/856,780

(22) Filed: Sep. 18, 2007

(65) Prior Publication Data

US 2009/0071366 A1 Mar. 19, 2009

(51) Int. Cl.
*C09D 11/02* (2006.01)

(52) U.S. Cl. .............. 106/31.61; 106/31.65; 106/31.86

(58) Field of Classification Search .............. 106/31.61, 106/31.65, 31.86
See application file for complete search history.

(56) References Cited

U.S. PATENT DOCUMENTS

| 5,345,254 | A | * | 9/1994 | Wong et al. | 347/100 |
| 5,889,083 | A | * | 3/1999 | Zhu | 523/161 |
| 6,022,547 | A | * | 2/2000 | Herb et al. | 424/401 |
| 2002/0073893 | A1 | * | 6/2002 | Campbell | 106/31.86 |
| 2008/0317958 | A1 | * | 12/2008 | Bhatt et al. | 427/258 |

* cited by examiner

*Primary Examiner*—Jerry Lorengo
*Assistant Examiner*—Veronica Faison Gee

(57) ABSTRACT

The present invention provides a pigment ink formulation containing a wax emulsion is disclosed. The wax emulsion comprises a specific wax and surfactant combination. In particular, the wax comprises a linear polyethylene wax and the surfactant is an alkyl ether carboxylate. The wax emulsion can be made by any process for preparing emulsions used by those skilled in the art such as typical homogenization methods. Applicants have discovered that such a wax emulsion can not only improve the scratch resistance of pigmented ink, but also improve other handling problems such as scuff and smear.

9 Claims, No Drawings

WAX EMULSION FOR INKJET INK

FIELD OF THE INVENTION

The present invention relates generally to ink employed in ink jet printers. More particularly it relates to inks that contain a wax emulsion to improve the printing properties of pigmented inks on photo paper, especially smear and scratch resistance.

BACKGROUND OF THE INVENTION

Ink jet printing is a non-impact method of printing that involves ejecting ink from a nozzle onto paper or other print media. The actual ink ejection method may occur via several processes including pressurized nozzles, electrostatic fields, piezoelectric elements within an ink nozzle, and heaters for vapor phase bubble formation.

The composition of the ink is traditionally comprised of deionized water, a water soluble organic solvent, and a colorant. The colorant may be a soluble dye or insoluble pigment. Several problems, however, are associated with soluble dyes that are not applicable to insoluble pigments. These problems include poor water-fastness, poor light-fastness, poor thermal stability, facile oxidation, dye crystallization, and ink bleeding and feathering on the print medium. To circumvent these problems, use of a pigment as the colorant is preferred. Pigments generally have better light-fast and water-fast properties, are more resistant to oxidation, and have higher thermal stability.

With the benefits obtained with pigment based inks, come new problems to overcome. Specifically, there are new problems in photo printing. When pigment based inks are printed on microporous photo paper, the paper acts like a filter in the sense that the bulk of the ink solids stay in the form of a cake on the paper surface. This leads to handling issues. Having the solids on the surface of the paper leaves the colorant exposed to mechanical forces when the photo is handled. Handling can lead to smearing and scratching of the print with current pigment ink formulations.

A specific type of scratch that occurs with current pigment inks is known as green scratch. This type of scratch occurs in gray and black areas of photos. The gray and black areas are composed by layering cyan, yellow, and magenta. When scratched, the cyan and yellow droplets have less mechanical strength than the magenta. This leads to smearing and blending of the cyan and yellow which results in a green color along the scratched area. Logical fixes would be to increase the mechanical strength of the ink cake or to protect the ink cake from mechanical forces by use of a coating or additive that provides sufficient protection.

By changing ink or photo paper formulation, many methods have been disclosed in the past to improve smear resistance. For example, US 20040102541 disclosed graft polymeric dispersants in pigment-based inks to increase smear resistance; US 20050166794 disclosed using a dispersed cellulose ester as a binder additive in pigment-based inks to enhance the durability of the printed images; US 20050134665 disclosed ink additives that contains benzyl methacrylate to increase smear resistance. US 20050110856, U.S. Pat. No. 6,020,397, and U.S. Pat. No. 6,503,307 disclosed some imaging fixing components (reactive liquids) to improve abrasion resistance. On the other hand, U.S. Pat. Nos. 6,844,035, 6,689,433, and 6,528,148 disclosed the use of a poly(vinyl alcohol polyethylene oxide) copolymer and other binders in polymer-based photo papers to improve smear-fastness. U.S. Pat. No. 6,626,531 disclosed the surface roughness from 0.2 to 2.0 µm to improve smear for pigment-based ink on a porous media.

Wax emulsions have been identified as a possible fix for this issue. Waxes are commonly used in ink and coatings formulations. They are known to improve various properties such as slip or lubrication, rub or abrasion resistance and anti-blocking. These properties relate to the handling issues that are observed with current pigment based inks. However, these wax emulsions can adversely affect print quality and/or jetting characteristics.

Shibata et al U.S. Pat. No. 4,724,002 discloses heat-sensitive transfer media containing an ink composition comprising a binder and a pigment. The binder may be a wax and the pigment may be an oil-based pigment or dry color which is suspended within the binder to impart a color to the ink.

Terry et al U.S. Pat. No. 3,406,137 discloses a pressure transfer ink formulation comprising a pigment dispersed in a binder. The binder is comprised of waxes, wax soluble dyes, an adhesive resin and polysiloxane.

Duff et al. U.S. Pat. No. 4,762,734 discloses an ink donor film comprising in a hydrocarbon solution of wax components and/or polymer components, or a mixture of wax and polymer components, dispersed in a polar phase containing dispersed pigment or dissolved dye. The coloring agent may include a dye and/or pigment wherein the dye is an alcohol or hydrocarbon-soluble dye.

Merritt et al. U.S. Pat. Nos. 4,390,369 and 4,484,948 disclose a natural-wax ink jet ink containing at least one natural wax. The wax may be used as a basic fluid vehicle or as an additive to other fluid vehicles. A coloring agent or dye such as an oil or solvent dye may be added to the composition.

Hayashi et al. U.S. Pat. No. 4,636,258 discloses an ink composition comprising a copolymer, a colorant dispersed therein, and wax or resin. The wax may be added to the colorant when dispersed in the copolymer.

Tabayashi et al. U.S. Pat. No. 4,878,946 discloses a hot melt ink for thermal ink-jet printers comprising an oil-soluble dye and additives dissolved in at least one compound that is solid at ambient temperature.

Trimble et al. U.S. Pat. No. 3,353,974 discloses a homogeneous composition for printing inks and various coatings comprising an oil, wax and/or resinous base, and a high concentration of dispersed pigments.

Wong et al. discloses jetting an ink composition comprising an emulsion of an organic phase in a water phase, the organic phase including at least one of oil and wax. The ink compositions preferably contain a pigment or dye, in either or both phases.

There is a need for ink compositions for ink jet printers which not only provide acceptable jetting properties and printing quality, but which also provide improved photo smear, scratch and scuff resistance properties.

It is an objective of this invention to provide pigment inks containing a wax emulsion that have improved photo smear, scratch and scuff resistance properties.

SUMMARY OF THE INVENTION

The present invention provides a pigment ink formulation containing a wax emulsion. The wax emulsion contains a specific wax and surfactant combination. In particular, the wax comprises a polyethylene wax that is linear and non-polar. The surfactant must have both nonionic and anionic functionality. The chemistries determined to be the best performers with the polyethylene wax are alkyl ether carboxylates and alkyl ether sulfates.

Applicants have discovered that such a wax emulsion can not only improve the scratch resistance of pigmented ink, but also improve other handling problems such as scuff and smear.

The wax emulsions of the present invention can be made by any process for preparing emulsions such as typical homogenization methods used by those skilled in the art. Some non-limiting examples of typical homogenization methods include the use of a microfluidizer, an ultrasonic horn, or the use of a rotor-stator type homogenizer. Each type of equipment may require some small changes in process, but overall the formation of the emulsion follows the same principals.

The ink formulations used in the current invention preferably contain 1% to 10% of common organic pigment of cyan, green, magenta, red, or yellow colors. The inks also preferably contain from about 10% to 30% of common humectants used in general inkjet ink formulations and about 70% to 80% distilled water. The inks may also contain surfactants, biocide and other components known to be used in inkjet ink compositions.

All percentages and ratios, used herein, are "by weight" unless otherwise specified. All molecular weights, used herein, are weight average molecular weights unless otherwise specified.

Additional embodiments, objects and advantages of the present invention will be further apparent in view of the following detailed description.

DETAILED DESCRIPTION OF THE INVENTION

The current invention makes use of a wax emulsion in a pigment based inkjet ink formulation which contains a specific wax and surfactant combination. As discussed in detail below, several wax and surfactant combinations were tried and it was discovered that specific properties are needed in the wax and surfactant combination in order to get the desired results from the ink.

Several surfactants were tested as shown in Table 1 below. It was determined that the surfactant must have both nonionic and anionic functionality. Totally anionic and totally nonionic surfactants were tested individually and did not give as good of performance as surfactants with the combination. The surfactant chemistry affects the jetting. This is thought to be related to the final particle size distribution and the stability of the wax emulsion.

In general, the best surfactants have an alkyl hydrophobic tail for better interaction with the wax and carboxylic or sulfonic acid groups for long term electrostatic stabilization of the emulsion. The ethylene oxide groups of the alkyl ethers offer steric stabilization to further enhance the long term stability.

The specific chemistries determined to be the best performers with the wax used in the present invention are alkyl ether carboxylates and alkyl ether sulfates, preferably lauryl ether carboxylates and lauryl ether sulfates, respectively. More specifically, the preferred surfactant is Akypo RLM 100 produced by Kao Corporation. The specific chemical of Akypo RLM 100 is lauryl ether (10 EO) carboxylate of the formula: $CH_3(CH_2)_{10}CH_2-O(CH_2-CH_2-O)_{10}CH_2-COOH$. An example of a suitable lauryl ether sulfate surfactant is STEOL CS-330 produced by Stepan Company.

TABLE 1

Different Surfactants

| Wax | Surfactant | Ratio | Jetting | Scratch |
|---|---|---|---|---|
| DS-1 Control No Wax | | | 1 | 5 |
| PW500 | Akypo RLM 100 | 11:1 | 1 | 1 |
| PW500 | Akypo RLM 100 | 5:1 | 1 | 1 |
| PW500 | Na Laury ether sulfate | 11:1 | 2 | 1 |
| PW500 | Na Lauryl sulfate | 11:1 | 2 | 1 |
| PW500 | Na Lauryl sulfate | 5:1 | 2 | 1 |
| PW500 | Zonyl FS 610 | 5:1 | 5 | 1 |
| PW500 | Triton x-405 | 5:1 | 5 | 1 |
| PW500 | Tergitol 15-s-12 | 5:1 | 5 | 1 |

Rating of 1 is the best and 5 is the worst.

Some waxes tested are listed below in Table 2. The preferred wax for the present invention is a completely non-polar and linear polyethylene wax with a narrow molecular weight distribution. Without being bound by theory, it is believed that the slip-aid or abrasion resistance performance of the wax additives is affected by the polarity of the wax. Higher acid/polar waxes show advantages in processing and emulsion stability, but do not give the same slip-aid or abrasion resistance effect as non-polar wax. In addition, because the wax emulsion is an aqueous based solution, waxes with melt points below 100° C. are preferred, but not required. The lower melt point waxes are preferred to avoid requiring the use of pressurized reactors to form the emulsion. The number average molecular weight of the polyethylene wax is preferred to be from 400 to 3000 and more preferably from 400 to 655. The melt point of the polyethylene wax is preferred to be from 79° C. to 129° C., and more preferably less than 100° C.

A specific group of waxes that meet the above criteria are the Polywax polyethylene waxes produced by Baker Petrolite. The best results are obtained by using Polywax 500 as shown in Table 2 below. Polywax 500 has a nominal average molecular weight of 500, a melting point of about 88° C., and a viscosity of about 4.1 centipoise at 135° C.

TABLE 2

Different Waxes

| Wax | Wax Type | Surfactant | Ratio | Jetting | Scratch |
|---|---|---|---|---|---|
| PW500 | Linear polyethylene Nonpolar | Akypo RLM 100 | 11:1 | 1 | 1 |
| PW400 | Linear polyethylene Nonpolar | Akypo RLM 100 | 11:1 | 1 | 2 |
| Unicid 350 | Primary carboxylated polyethylene | Akypo RLM 100 | 11:1 | 1 | 3 |

TABLE 2-continued

Different Waxes

| Wax | Wax Type | Surfactant | Ratio | Jetting | Scratch |
|---|---|---|---|---|---|
| Ceramer 1608 | Selfdispersing Carboxylated polyethylene | Self dispersed | NA | 1 | 5 |
| Unithox 470 | Ethoxylated polyethylene | Akypo RLM 100 | 11:1 | 1 | 5 |
| WE-6 | Branched Polyester | Akypo RLM 100 | 11:1 | 1 | 3 |
| WE-3 | Linear Polyester | Akypo RLM 100 | 11:1 | 1 | 3 |
| Paraflint C80 w/ Carnauba (80:20) | C80 is a Fischer Tropsch Polyethylene | Akypo RLM 100 | 11:1 | 1 | 3 |

Rating of 1 is the best and 5 is the worst.

Several ratios were tested for the weight of wax to the weight of surfactant. The working range is between 1:1 and 20:1, but better results are obtained between 5:1 and 11:1. The preferred formulation is at 11:1.

The wax emulsions described above were tested in various formulations of pigmented ink. The ink formulations used in the current invention preferably contain from about 1% to 10% of common organic pigment of cyan, green, magenta, red, or yellow colors. The inks also preferably contain from about 10% to 30% of common humectant used in general inkjet ink formulations and about 70% to 80% distilled water. The inks may also contain surfactants, biocide and other conventional components known to be used in inkjet ink compositions.

It was discovered that to have sufficient surface protection and proper jetting performance, the wax emulsion disclosed here should have a concentration between 0.1 wt % to 5 wt % based on wax in the ink formulation, more preferably, a concentration between 0.2 wt % and 2 wt %.

It was also discovered that such a wax emulsion can not only improve the scratch resistance of pigmented ink, but also improve other handling problems such as scuff and smear.

The wax emulsions of the present invention can be made by any process for preparing emulsions such as typical homogenization methods used by those skilled in the art. Some non-limiting examples include the use of a microfluidizer such as the Model 110Y from Microfluidics, an ultrasonic horn such as the Branson Sonifier 450, or the use of a rotor-stator type homogenizer such as the Ultra-Turrax T50 from IKA. Each type of equipment may require some small changes in process, but overall the formation of the emulsion follows the same principals.

The examples for this invention use a microfluidizer as the method for forming the emulsions. The wax emulsion is prepared by first dissolving the surfactant into DI water while stirring. Once dissolved, base is added to adjust the pH to from about 8.0 to about 8.5. Next, the surfactant/water solution is transferred to a homogenizer reservoir where it is heated above the melt point of the wax. The wax is slowly added into the heated solution until it is all melted and then homogenized until the desired particle size is reached. The hot solution is removed from the homogenizer and cooled while maintaining stirring. The final particle size should be <250 nm and % solids in the emulsion should be from about 10% to about 35%. The wax emulsions are then added to the aqueous inkjet ink compositions described below.

The aqueous inkjet ink compositions of the present invention comprise color pigment and a wax emulsion in an aqueous medium. The aqueous medium may comprise water, preferably distilled and/or deionized water, or may comprise water in combination with one or more water-miscible organic solvents. In a preferred embodiment, the aqueous medium is deionized water.

A wide variety of organic and inorganic pigments are known in the art for use in inkjet printing systems and are suitable for use in the compositions of the present invention, alone or in combination. The pigment dispersion particles must be sufficiently small to permit free flow of the ink through the inkjet printing device, and particularly the ink jet print nozzles, which typically have diameters in the range of from about 10 to about 50 µm, and more typically of about 30 µm or less. The particle size of the pigment should also be selected to maintain pigment dispersion stability in the ink, and it is generally desirable to use smaller sized particles for maximum color strength. Accordingly, pigment dispersion particles having a size in the range of from about 50 nm to about 5 µm, and more preferably less than about 1 µm, are preferred.

Pigments which are suitable for use in the present compositions include, but are not limited to, azo pigments such as condensed and chelate azo pigments; polycyclic pigments such as phthalocyanines, anthraquinones, quinacridones, thioindigoids, isoindolinones, and quinophthalones; nitro pigments; daylight fluorescent pigments; carbonates; chromates; titanium oxides; zinc oxides; iron oxides and carbon black. In one embodiment, the pigment is other than a white pigment, such as titanium dioxide. Preferred pigments employed in the ink composition include carbon black and pigments capable of generating a cyan, magenta and yellow ink. Suitable commercially available pigments include, for example, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3. The pigments may be prepared via conventional techniques.

The ink compositions may also include a dispersant, typically for dispersing the pigment therein. The dispersant may be polymeric or nonpolymeric. The term "polymeric dispersant" as used herein, is meant to include homopolymers, copolymers, terpolymers and immiscible and miscible polymer blends. Suitable non-polymeric dispersants include naphthalene sulfonic acid, sodium lignosulfate and glycerol stearate. Numerous polymeric dispersants are known in the art and are suitable for use in the present compositions. The polymeric dispersant may comprise a random polymer or a structured polymer, for example a block copolymer and/or branched polymer, or mixtures thereof, and the dispersant polymer may be anionic or nonionic in nature. Suitably, polymers having both hydrophilic sections for aqueous compatibility and hydrophobic sections for interaction with the pigment are preferred.

Suitable polymeric dispersants are known in the art, for example, in U.S. Pat. Nos. 5,821,283, 5,221,334, 5,712,338, and 5,714,538, all of which are incorporated herein by reference.

Alternatively, pigment known as a self-dispersed pigment can be used or mixtures of a self-dispersed pigment and a pigment with dispersant. Pigments known as self-dispersed pigments or self-dispersing have been created with a surface modification. Such pigments can be surface modified in a variety of ways including, but not limited to, treatment with alkali salts of hypochlorite, ozone, and diazonium salts of aromatic sulfonic acid additions. These surface modified pigments have the distinct advantage of being self-dispersed in aqueous media and can be used without a corresponding polymeric dispersing agent. The surface modification can be performed on both black and color pigments.

For the purposes of this invention, the polymeric dispersant composition is not critical as long as its use results in a stable and printable ink. Polymeric dispersants are typically used at 0.1 to 5 wt %, based on the total weight of the ink. Pigment dispersions can be made by mixing pigment, dispersant, water, and optional additives and milling in, for example, a horizontal media mill, a vertical media mill, and an attritor mill.

The aqueous ink jet compositions may also include a humectant. Humectants for use in ink jet ink compositions are known in the art and are suitable for use herein. Examples include, but are not limited to, alcohols, for example, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and monoalcohols such as n-propanol and iso-propanol.

Preferably the humectants are selected from the group consisting of alcohols, glycols, pyrrolidones, and mixtures thereof. Preferred humectants include 2,2'-thiodiethanol, glycerol, 1,3-propanediol, 1,5-pentanediol, polyethylene glycol, ethylene glycol, diethylene glycol, triethylene glycol, propylene glycol, tetraethylene glycol, 2-pyrrolidone, n-propanol and mixtures thereof.

The aqueous ink jet ink compositions according to the present invention may employ the pigment, humectant, and dispersant in amounts suitable for obtaining desired print properties. In preferred embodiments, the aqueous compositions comprise, by weight, from about 1% to about 20% pigment, from about 5% to about 50% humectant, and from about 0.01% to about 10% dispersant, and from about 0.1% to 5% wax emulsion (based on weight of wax in the wax emulsion). More preferably, the compositions comprise, by weight, from about 1% to about 10% pigment, from about 10% to about 30% humectant, from about 0.1% to about 5% dispersant, and from about 0.2% to about 2% wax emulsion (based on weight of wax in the wax emulsion). Even more preferred, are compositions comprising, by weight, from about 4% to about 8% pigment, from about 15% to about 25% humectant, from about 0.1% to about 4% dispersant, and from about 0.4% to about 1.5% wax emulsion (based on weight of wax in the wax emulsion).

The ink compositions may further include conventional additives known in the art. For example, the compositions may comprise one or more biocides to allow long term stability. Suitable biocides include benz-isothiazolin-one, methyl-isothiazolin-one, chloro-methyl-isothiazolin-one, sodium dihydroacetate, sodium sorbate, sodium 2-pyridinethiol-1-oxide, sodium benzoate and sodium pentachlorophenol. Examples of commercially available biocides are Zolidine™, Proxel™, Givguard™, Canguard 327™ and Kathon® PFM. The compositions may further include fungicides, bactericides, penetrants, surfactants, anti-kogation agents, anti-curling agents and/or buffers, various examples of which are known in the art. The inkjet ink compositions suitably have a pH of from about 7.5 to about 8.5.

The aqueous ink jet ink compositions may be prepared in accordance with conventional processing techniques. Typically, the pigment is combined with the dispersant to provide a pigment dispersion which is then combined with additional components of the compositions. The compositions may be employed in ink jet printing methods in a conventional manner, wherein a droplet of the ink composition is ejected through a printhead nozzle in response to an electrical signal and onto a surface of a paper recording medium.

The following example is a description of the aqueous pigmented inkjet ink compositions of the present invention. The descriptions fall within the scope of, and serve to exemplify, the more general description set forth above. The example is presented for illustrative purposes only, and is not intended as a restriction on the scope of the invention.

EXAMPLE

Chemicals:
Polywax 500 from Baker-Petrolite
Akypo RLM-100 from Kao
potassium hydroxide
 Equipment:
Microfluidics model M-110Y Microfluidizer Homogenizer
 Formula:
140.00 g Polywax 500
12.73 g Akypo RLM-100
610 g DI water
potassium hydroxide solution
 Procedure:
1. Weigh out raw materials.
2. With stirring, slowly add Akypo RLM-100 to DI water.
3. Once dissolved, add potassium hydroxide solution to adjust pH to 8.0 to 8.5.
4. Transfer Akypo/water solution to homogenizer reservoir. Begin processing in recirculation mode.
5. Once solution temperature is around 90° C. slowly add wax until it is all melted while maintaining temperature.
6. After wax is melted process for 20-30 minutes at maximum pressure.
7. Remove hot solution from homogenizer and cool while maintaining stirring.
8. Final particle size should be <150 nm and % solids 18 to 22%.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An aqueous inkjet ink for inkjet printers comprising a wax emulsion having an average particle size less than 250 nm that comprises a mixture of a linear and nonpolar polyethylene wax with a number average molecular weight from 400 to 655 and an alkyl ether carboxylate or alkyl ether sulfate surfactant having both nonionic and anionic functionality, a color pigment, and an aqueous carrier.

2. The aqueous inkjet ink of claim 1 wherein weight of wax to the weight of surfactant in the wax emulsion is between 1:1 and 20:1.

3. The aqueous inkjet ink of claim 1 wherein the weight of wax to the weight of surfactant in the wax emulsion is between 5:1 and 11:1.

4. The aqueous inkjet ink of claim 2 wherein said wax emulsion comprises from about 0.1 wt % to about 5 wt % of the aqueous inkjet ink, based on the weight of the wax in the ink.

5. The aqueous inkjet ink of claim 4 wherein said wax emulsion comprises from about 0.2 wt % to about 2 wt % of the aqueous inkjet ink, based on the weight of the wax in the ink.

6. The aqueous inkjet ink of claim 1 wherein the alkyl ether carboxylate surfactant is a lauryl ether carboxylate and the alkyl ether sulfate surfactant is a lauryl ether sulfate.

7. The aqueous inkjet ink of claim 1 wherein said surfactant is an lauryl ether carboxylate having the formula: $CH_3(CH_2)_{10}CH_2-O(CH_2-CH_2-O)_{10}CH_2-COOH$.

8. The aqueous inkjet ink of claim 1 wherein the inkjet ink further comprises a humectant.

9. The aqueous inkjet ink of claim 8 wherein the inkjet ink comprises from about 0.1% to about 5% by weight of wax, 1 to 10% by weight of color pigment, from about 10 to about 30% by weight humectant, and from about 70 to about 80% distilled water.

* * * * *